United States Patent
Kitazawa et al.

(10) Patent No.: US 7,717,367 B2
(45) Date of Patent: May 18, 2010

(54) PRETENSIONER DEVICE

(75) Inventors: Yasuho Kitazawa, Aichi-ken (JP);
Hitoshi Takamatsu, Aichi-ken (JP);
Masaki Yasuda, Aichi-ken (JP);
Kazuhiko Aihara, Aichi-ken (JP);
Toshio Nakashima, Aichi-ken (JP);
Tomonori Nagata, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 943 days.

(21) Appl. No.: 11/343,216

(22) Filed: May 23, 2006

(65) Prior Publication Data

US 2006/0208475 A1 Sep. 21, 2006

(51) Int. Cl.
*B60R 22/46* (2006.01)
*B60R 22/405* (2006.01)
(52) U.S. Cl. ...................... 242/374; 242/394
(58) Field of Classification Search ................ 242/374, 242/390, 390.8, 390.9, 394; 280/806, 807; 297/475–478; 244/122 B
See application file for complete search history.

(56) References Cited

U.S. PATENT DOCUMENTS

| | | | |
|---|---|---|---|
| 5,489,072 A * | 2/1996 | Gordon et al. | 242/374 |
| 5,788,176 A * | 8/1998 | Ebner et al. | 242/374 |
| 5,794,875 A * | 8/1998 | Schmid | 242/374 |
| 5,906,328 A * | 5/1999 | Hamaue et al. | 242/374 |
| 6,113,022 A * | 9/2000 | Ono et al. | 242/379.1 |
| 6,454,199 B1 | 9/2002 | Hori et al. | |

FOREIGN PATENT DOCUMENTS

| | | |
|---|---|---|
| GB | 2 264 629 A | 9/1993 |
| JP | 2003-212089 | 7/2003 |
| JP | 2004-175279 | 6/2004 |

OTHER PUBLICATIONS

European Search Report dated May 19, 2006.

* cited by examiner

*Primary Examiner*—John Q Nguyen
*Assistant Examiner*—Scott Haugland
(74) *Attorney, Agent, or Firm*—Roberts Mlotkowski Safran & Cole, P.C.; Thomas W. Cole

(57) ABSTRACT

In a pretensioner device, engaging teeth of a pinion (rotating body) have first projections which project-out toward the other side in the peripheral direction of a cam portion. Meshing claws of a clutch plate have second projections which project-out toward a one side in the peripheral direction of the cam portion, and whose gear portion side end surfaces face the first projections. In a state before operation of the pretensioner device, movement of the clutch plate toward one side in the axial direction with respect to the pinion is restricted due to the second projections engaging with the first projections. Accordingly, in the pretensioner device, in the state before operation, even if some type of external force is applied to the clutch plate, positional offset of the clutch plate toward the one side in the axial direction with respect to the pinion can be prevented.

11 Claims, 4 Drawing Sheets

PRETENSIONER DEVICE

CROSS-REFERENCE TO RELATED APPLICATIONS

This application claims benefit of and priority to Japanese Patent Application No. 2005-026159, filed on Feb. 2, 2005, which is incorporated herein by reference in its entirety for all purposes.

BACKGROUND OF THE INVENTION

1. Field of the Invention

The present invention relates to a pretensioner device which is provided at a webbing retractor which takes up a webbing (belt) for restraining a vehicle occupant in layers on a take-up shaft, the pretensioner device rotating the take-up shaft by a predetermined amount in a webbing take-up direction instantaneously due to a gas generating means operating at the time when a vehicle rapidly decelerates or the like.

2. Description of the Related Art

As can be seen in Japanese Patent Application Laid-Open (JP-A) No. 2004-175279 for example, there are webbing retractors which are provided with a spool (take-up shaft) around which a webbing is taken-up in layers, and a pretensioner device which forcibly rotates the spool in a webbing take-up direction when the vehicle rapidly decelerates.

In this type of pretensioner device, a clutch mechanism is set such that the connection with the spool is cut-off at usual times, and the clutch mechanism connects with the spool only when the vehicle rapidly decelerates. There are various types of this clutch mechanism, but hereinafter, the clutch mechanism disclosed in JP-A No. 2004-175279 will be explained and studied.

In the pretensioner device disclosed in JP-A No. 2004-175279, a torsion bar, which functions as a force limiter, is disposed in a state of being inserted in the axially central portion of a spool. The clutch mechanism, which is structured by a sleeve, a pinion (rotating body), and a clutch plate, is disposed coaxially at one end portion in the axial direction of the torsion bar. The sleeve is formed substantially in the shape of a cylindrical tube, and fits-together with one end portion in the axial direction of the torsion bar so as to be unable to rotate relative thereto. Accordingly, when the spool rotates, the sleeve rotates integrally therewith via the torsion bar.

The inner peripheral surface of the sleeve is subjected to knurling. A plurality of meshing claws, which are formed by cutting and raising at the axially central side of the clutch plate, are disposed in a state of facing the knurled surface. The plurality of meshing claws fit-together with the valley portions of windmill-like engaging teeth formed at a pinion. The pinion meshes-together with a piston having a rack bar. The piston moves due to a gas generating means operating at the time when the vehicle rapidly decelerates. When, due to the movement of the piston, the pinion is rapidly rotated, the plurality of meshing claws of the clutch plate deform and ride up on the mountain portions of the engaging teeth of the pinion, and engage with the knurled surface of the sleeve. In this way, the rotation of the pinion is transmitted to the sleeve via the clutch plate, and the spool is rotated in the webbing take-up direction integrally with the torsion bar and the sleeve.

In the pretensioner device (clutch mechanism) of the above-described structure, before operation, the clutch plate is supported by the pinion due to the plurality of meshing claws fitting-together with the valley portions of the engaging teeth of the pinion. If some type of external force acts on the clutch plate, there is the possibility that the position of the clutch plate with respect to the pinion will become offset.

SUMMARY OF THE INVENTION

In view of the aforementioned, an object of the present invention is to provide a pretensioner device which can prevent positional offset of a clutch plate with respect to a rotating body.

In order to overcome the above-described problem, a pretensioner device of a first aspect of the present invention comprises: a cylindrical portion provided coaxially and integrally with one side in the axial direction of a take-up shaft at which a webbing for restraining a vehicle occupant is taken-up and pulled-out, the cylindrical portion being open toward an outer side; a piston provided at one side in the axial direction of the cylindrical portion, and moving due to operation of a gas generating means at a predetermined time; a rotating body which is disposed relatively rotatably at an inner side of the cylindrical portion and at whose outer peripheral portion a plurality of engaging teeth are formed, the rotating body being rotated in a webbing take-up direction due to the piston moving; and a clutch plate having a plurality of meshing claws which are connected together integrally and which respectively fit-together with valley portions of the plurality of engaging teeth of the rotating body, and when the rotating body rotates relatively in the webbing take-up direction, the plurality of meshing claws are guided by the plurality of engaging teeth, and deform outwardly, and engage an inner peripheral surface of the cylindrical portion, wherein the engaging teeth of the rotating body have first projections which project-out in a peripheral direction of the rotating body, the meshing claws of the clutch plate have second projections which project-out in the peripheral direction of the rotating body and whose end surfaces, at one side in an axial direction of the rotating body, face the first projections, and due to the second projections engaging with the first projections, movement of the clutch plate in an axial direction with respect to the rotating body is restricted.

In the pretensioner device of the above-described aspect, when the gas generating means operates at a predetermined time, the piston moves, and the rotating body is rotated in the webbing take-up direction. The plurality of meshing claws of the clutch plate are thereupon guided by the plurality of engaging teeth of the rotating body, deform outwardly, and engage with the inner peripheral surface of the cylindrical portion. The cylindrical portion and the rotating body are thereby integrally connected via the clutch plate. Because the cylindrical portion is provided integrally with the take-up shaft, the rotation of the rotating body in the webbing take-up direction is transmitted to the take-up shaft via the clutch plate and the cylindrical portion, the take-up shaft is rotated in the webbing take-up direction, and the webbing is taken-up on the take-up shaft.

Here, in this pretensioner device, the engaging teeth of the rotating body have the first projections which project-out in the peripheral direction of the rotating body. Further, the meshing claws of the clutch plate have the second projections which project-out in the peripheral direction of the rotating body, and whose end surfaces at one side in the axial direction of the rotating body face the first projections. Movement in the axial direction of the clutch plate with respect to the rotating body is restricted due to the second projections engaging with the first projections. Accordingly, in this pretensioner device, even in a case in which some type of external force is applied to the clutch plate, positional offset of the clutch plate in the axial direction with respect to the rotating body can be prevented.

The pretensioner device of the above-described aspect may be structured such that the piston has a rack bar which projects in a moving direction, the rotating body has a plurality of pinion teeth which are formed integrally with one side in the axial direction of the plurality of engaging teeth, and which are disposed at an outer side of the cylindrical portion, and with which the rack bar meshes-together when the piston moves, the first projections of the rotating body are formed at the pinion teeth side of the engaging teeth, and movement in the axial direction of the clutch plate toward a pinion teeth with respect to the rotating body is restricted.

In the above-described pretensioner device, when the piston moves due to the operation of the gas generating means, the rack bar of the piston meshes-together with the pinion teeth of the rotating body, and the rotating body is rotated in the webbing take-up direction. Further, the first projections formed at the rotating body are formed at the pinion teeth side of the engaging teeth. Movement in the axial direction of the clutch plate toward the pinion teeth with respect to the rotating body is restricted due to the second projections, which are formed at the meshing claws, engaging with the first projections of the rotating body. Accordingly, the clutch plate can be prevented from interfering with the rack bar when the piston moves and the rack bar meshes-together with the pinion teeth of the rotating body.

Further, the pretensioner device of the above-described aspect may be structured such that the first projections of the rotating body are formed only at one side in the peripheral direction of the engaging teeth of the rotating body, and the second projections of the clutch plate are formed only at one side in the peripheral direction of the meshing claws of the rotating body.

In the above-described pretensioner device, the first projections of the rotating body are formed only at one side in the peripheral direction of the engaging teeth of the rotating body. The second projections of the clutch plate are formed only at one side in the peripheral direction of the meshing claws of the rotating body. Accordingly, as compared with a case in which the first projections are formed at the both sides in the peripheral direction of the engaging teeth of the rotating body and the second projections are formed at the both sides in the peripheral direction of the meshing claws of the rotating body, the configurations are simple, and the surface area of engagement between the first projections and the second projections (i.e., the strength of engagement between the first projections and the second projections) can be ensured easily.

A pretensioner device of another aspect of the present invention comprises: a cylindrical portion provided coaxially and integrally with one side in the axial direction of a take-up shaft at which a webbing for restraining a vehicle occupant is taken-up and pulled-out, the cylindrical portion being open toward an outer side; a piston provided at one side in the axial direction of the cylindrical portion, and moving due to operation of a gas generating means at a predetermined time; a rotating body which is disposed relatively rotatably at an inner side of the cylindrical portion and at whose outer peripheral portion a plurality of engaging teeth are formed, the rotating body being rotated in a webbing take-up direction due to the piston moving; and a clutch plate having a plurality of meshing claws which are connected together integrally and which respectively fit-together with valley portions of the plurality of engaging teeth of the rotating body, and when the rotating body rotates relatively in the webbing take-up direction, the plurality of meshing claws are guided by the plurality of engaging teeth, and deform outwardly, and engage an inner peripheral surface of the cylindrical portion, wherein the engaging teeth of the rotating body have rotation restricting walls which face end surfaces in the webbing take-up direction of the meshing claws of the clutch plate, and due to the end surfaces of the meshing claws engaging with the rotation restricting walls, relative rotation of the clutch plate in the webbing take-up direction with respect to the rotating body is restricted.

In the pretensioner device of the above-described aspect, when the gas generating means operates at a predetermined time, the piston moves, and the rotating body is rotated in the webbing take-up direction. The plurality of meshing claws of the clutch plate are thereupon guided by the plurality of engaging teeth of the rotating body, deform outwardly, and engage with the inner peripheral surface of the cylindrical portion. The cylindrical portion and the rotating body are thereby integrally connected via the clutch plate. Because the cylindrical portion is provided integrally with the take-up shaft, the rotation of the rotating body in the webbing take-up direction is transmitted to the take-up shaft via the clutch plate and the cylindrical portion, the take-up shaft is rotated in the webbing take-up direction, and the webbing is taken-up on the take-up shaft.

Here, in this pretensioner device, the engaging teeth of the rotating body have the rotation restricting walls which face end surfaces in the webbing take-up direction of the meshing claws of the clutch plate. Due to these end surfaces of the meshing claws engaging with the rotation restricting walls of the rotating body, relative rotation of the clutch plate in the webbing take-up direction with respect to the rotating body is restricted. Accordingly, in this pretensioner device, even in a case in which some type of external force is applied to the clutch plate, positional offset of the clutch plate in the webbing take-up direction with respect to the rotating body can be prevented.

As described above, in the pretensioner device relating to the present invention, positional offset of the clutch plate with respect to the rotating body can be prevented.

DETAILED DESCRIPTION OF THE INVENTION

Figure 1:
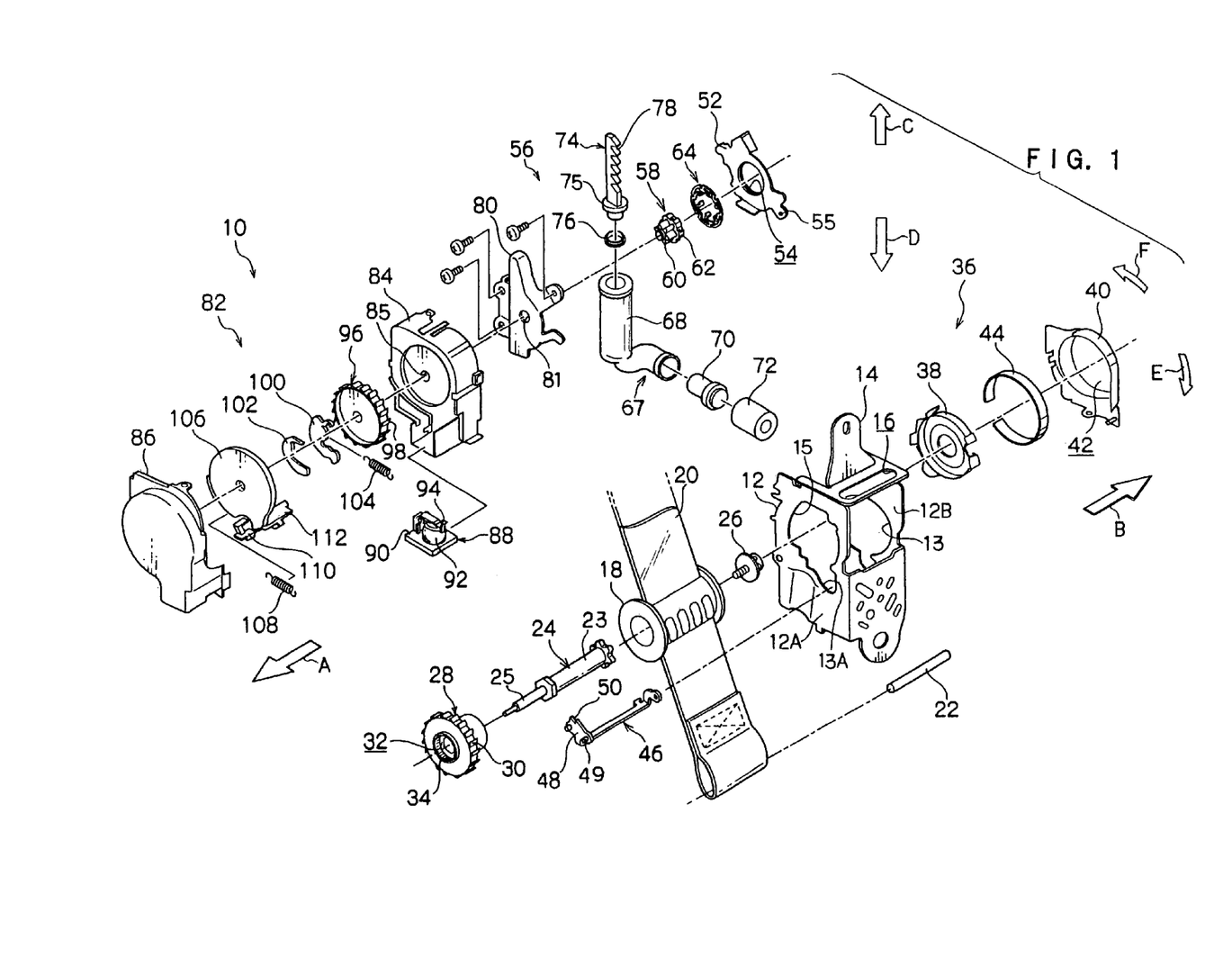
FIG. 1 is an exploded perspective view showing the overall structure of a webbing retractor which is structured by applying a pretensioner device relating to an embodiment of the present invention.

The structure of a webbing retractor 10, which is structured by applying a pretensioner device 56 relating to an embodiment of the present invention, is shown in an exploded perspective view in FIG. 1.

The webbing retractor 10 relating to the present embodiment has a frame 12 which is shaped as a substantially U-shaped plate as seen in top view. The frame 12 is fixed to the interior of a vehicle passenger compartment. A connecting piece 14 spans between the top end of the one side wall 12A and the top end of the other side wall 12B of the frame 12. The connecting piece 14 is fixed to the interior of the vehicle passenger compartment, and an hole 16 for inserting through is formed in the connecting piece 14. A substantially circular hole 15 for inserting through is formed in the one side wall 12A of the frame 12, and a circular hole 13 for inserting through is formed in the other side wall 12B.

A cylindrical-tube-shaped spool 18 serving as a take-up shaft is supported so as to be freely rotatable between the one side wall 12A and the other side wall 12B of the frame 12. The proximal end portion of an elongated, belt-shaped webbing 20 for restraining a vehicle occupant is anchored to the spool 18 by a solid-cylindrical shaft 22. When the spool 18 is rotated in one direction around the axis thereof (hereinafter, this direction will be called the "take-up direction"), the webbing 20 is taken-up from the proximal end thereof onto the outer peripheral portion of the spool 18. On the other hand, when the webbing 20 is pulled from the distal end thereof, accompanying this, the webbing 20 is pulled-out as the spool 18 rotates (hereinafter, the direction of rotation of the spool 18 at the time when the webbing 20 is pulled-out will be called the "pull-out direction").

A torsion shaft 24 (energy absorbing member), which structures a force limiter mechanism, is disposed at the axially central portion of the spool 18. The torsion shaft 24 has a torsionally deforming portion 23 and a pivot portion 25. The torsionally deforming portion 23 can torsionally deform due to the application of a torsional load of a predetermined value or more. The pivot portion 25 is provided coaxially and integrally with one end portion in the axial direction (end portion in the arrow A direction) of the torsionally deforming portion 23. The pivot portion 25 passes through the hole for inserting through 15 of the one side wall 12A, and projects-out toward the outer side (in the arrow A direction) of the frame 12.

A screw member 26 is screwed together with the other end portion in the axial direction (end portion in the arrow B direction) of the torsionally deforming portion 23. This other end portion in the axial direction of the torsionally deforming portion 23 and the other end portion in the axial direction (end portion in the arrow B direction) of the spool 18 are connected integrally by this screw member 26. The torsion shaft 24 thereby rotates integrally with the spool 18.

A lock gear 28, which serves as a cylindrical portion and structures the force limiter mechanism and the pretensioner device 56, is provided at one side in the axial direction (in the direction of arrow A) of the spool 18, coaxially with the spool 18. The lock gear 28 is disposed within the hole for inserting through 15 of the one side wall 12A, and is anchored to one end portion in the axial direction (end portion in the arrow A direction) of the torsionally deforming portion 23 so as to be unable to rotate relative thereto. At times other than when the torsionally deforming portion 23 is torsionally deformed, the lock gear 28 rotates integrally with the torsion shaft 24 and the spool 18. Ratchet teeth 30 are formed at the outer periphery of the lock gear 28. A circular hole 32, which is coaxial with the spool 18 and opens toward the outer side (the side opposite to the spool 18, i.e., in the direction of arrow A), is formed in the central portion of the lock gear 28. The entire inner peripheral surface of the circular hole 32 is subjected to knurling, such that a knurled surface 34 is formed thereat.

An urging mechanism 36 is provided at the other side (in the direction of arrow B) of the frame 12. The urging mechanism 36 has a spring seat 38. The spring seat 38 is mounted to the outer side of the other side wall 12B of the frame 12. The spring seat 38 covers the surface on the other side on of the spool 18 in a state in which the screw member 26 projects-out at the other side of the frame 12. The other side (in the direction of arrow B) of the spring seat 38 is covered by a spring cover 40, and the spring cover 40 is mounted to the outer side of the other side wall 12B of the frame 12. A substantially cylindrical concave portion 42 is formed in the spring cover 40, and opens toward one side (in the direction of arrow A).

A spiral spring 44 is provided within the concave portion 42 of the spring cover 40. The outer side end of the spiral spring 44 is fixed to the inner peripheral surface of the concave portion 42. The inner side end of the spiral spring 44 is fixed to the screw member 26. The spiral spring 44 urges the torsion shaft 24, the spool 18, and the lock gear 28 in the take-up direction via the screw member 26.

A gear case 52 made of resin is provided at the outer side (in the direction of arrow A) of the one side wall 12A of the frame 12. The gear case 52 covers one side in the axial direction (in the direction of arrow A) of the lock gear 28, and holds the lock gear 28, i.e., the axial direction position of the spool 18, at a predetermined position. A circular hole for inserting through 54 is formed in the central portion of the gear case 52, and the hole for inserting through 54 exposes the circular hole 32 of the lock gear 28. Further, a circular supporting hole 55 is formed so as to pass through the diagonally lower portion of the gear case 52. This supporting hole 55 corresponds to a locking member 46.

The locking member 46 spans between one side wall 12A and the other side wall 12B of the frame 12. The end on the other side (end portion in the direction of arrow B) of the locking member 46 is rotatably supported either directly or indirectly at the other side wall 12B of the frame 12. A lock plate 48 is provided at the end on one side (end portion in the direction of arrow A) of the locking member 46. The lock plate 48 is disposed diagonally downward of the lock gear 28. A circular-shaft-shaped rotation shaft 49 is formed integrally at the lower end (end portion in the direction of arrow D) of the lock plate 48. Due to the rotation shaft 49 being inserted through the supporting hole 55 of the gear case 52, one side end of the locking member 46 is rotatably supported by the gear case 52 at the rotation shaft 49. Lock teeth 50 are formed at the upper end (end portion in the direction of arrow C) of the lock plate 48. The lock plate 48 is disposed at the opposite side of the lock gear 28, and the lock teeth 50 are in a state in which they cannot mesh together with the ratchet teeth 30 of the lock gear 28.

On the other hand, a pinion 58, which serves as a rotating body structuring the pretensioner device 56, is disposed coaxially to the lock gear 28, at the side of the lock gear 28 opposite to the side at which the spool 18 is located.

Figure 2:
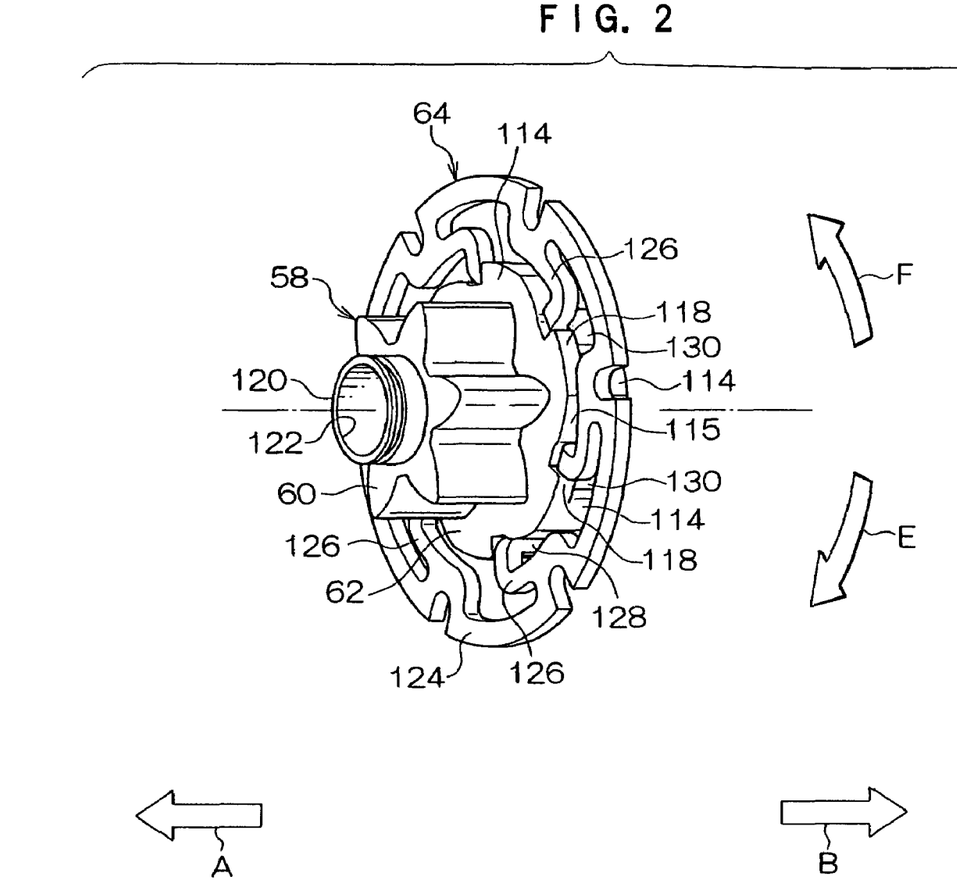
FIG. 2 is a perspective view showing the structures of a rotating body and a clutch plate, which are structural members of the pretensioner device relating to the embodiment of the present invention.
Figure 3:
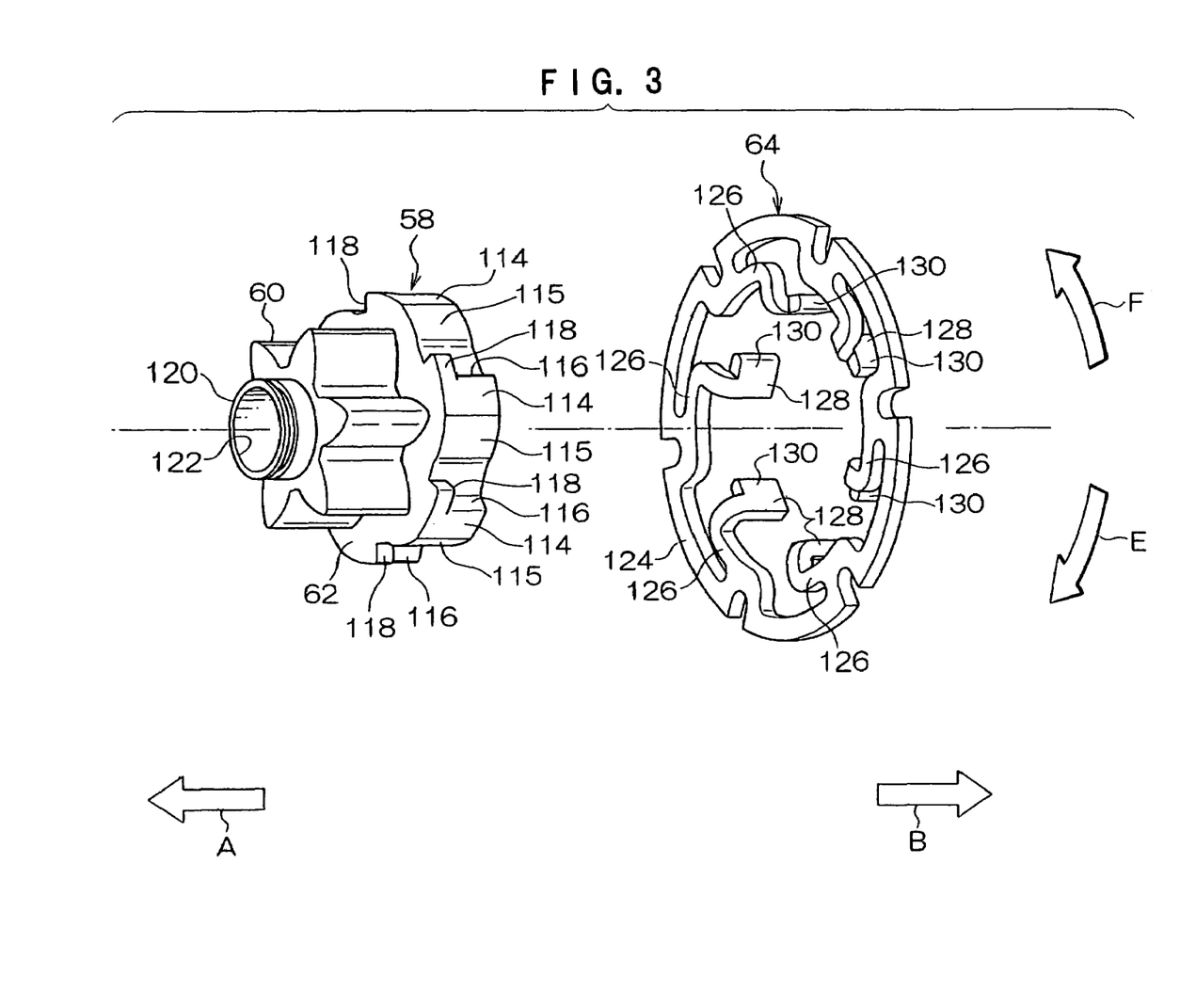
FIG. 3 is an exploded perspective view showing the structures of the rotating body and the clutch plate, which are structural members of the pretensioner device relating to the embodiment of the present invention.
Figure 4:
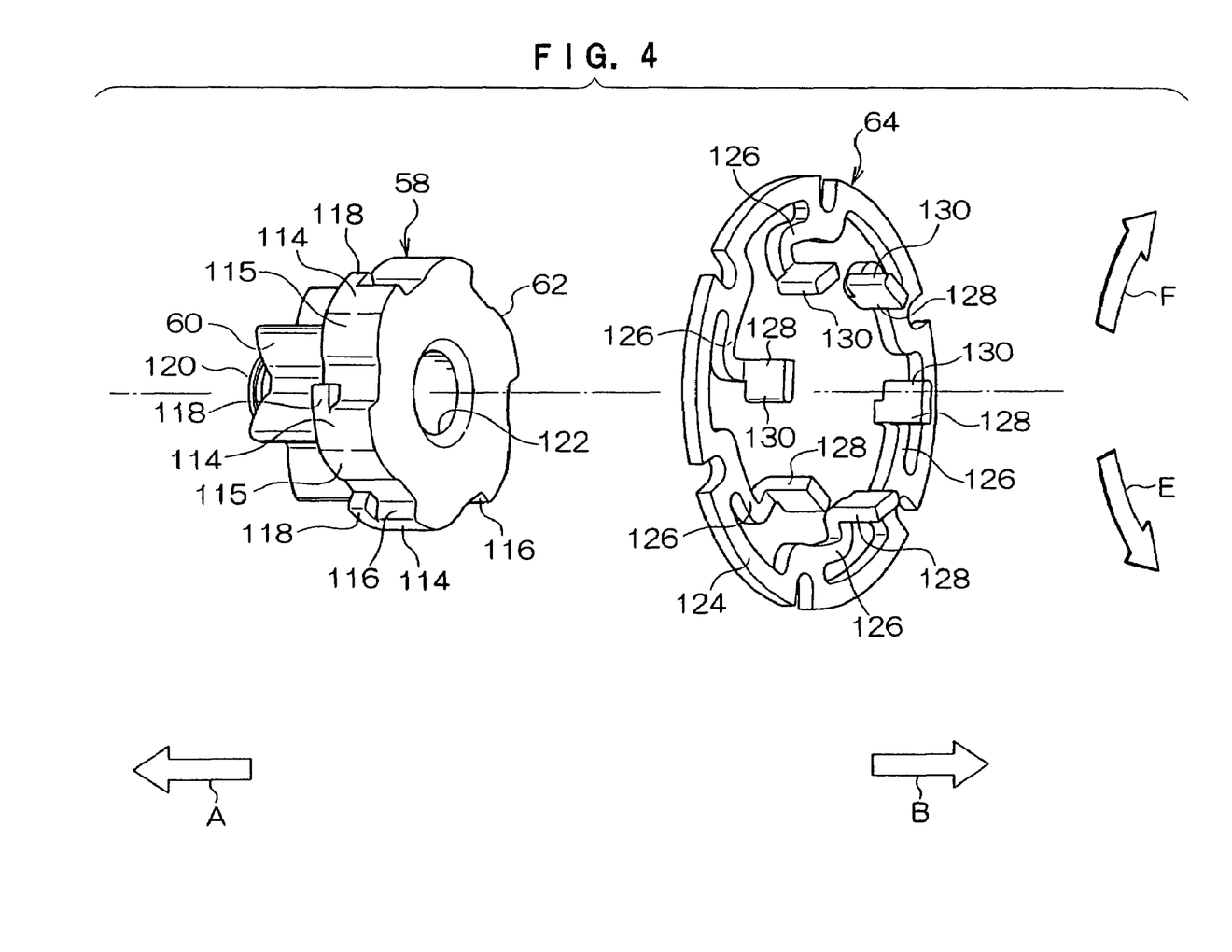
FIG. 4 is an exploded perspective view showing the structures of the rotating body and the clutch plate, which are structural members of the pretensioner device relating to the embodiment of the present invention.

As shown in FIGS. 2 through 4, the pinion 58 has a cam portion 62 which is formed in the shape of a cylindrical tube whose axial direction dimension is short. A plurality of engaging teeth 114 are formed at uniform intervals along the peripheral direction at the outer peripheral portion of the cam portion 62. At each of the engaging teeth 114, the side wall thereof at one side in the peripheral direction of the cam portion 62 (the side in the take-up direction, i.e., in the direction of arrow E) is an inclined surface 115 which is inclined with respect to the peripheral direction of the cam portion 62. The side wall of the engaging tooth 114 at the other side in the peripheral direction of the cam portion 62 (side in the pull-out direction, i.e., in the direction of arrow F) is a rotation restricting wall 116 which is parallel to the radial direction of the cam portion 62. Further, a first projection 118 is formed at each engaging tooth 114. The first projection 118 projects from a gear portion 60 side (the side in the direction of arrow A) end portion of the rotation restricting wall 116 toward the other side in the peripheral direction of the cam portion 62 (the side in the pull-out direction, i.e., in the direction of arrow F).

The pinion 58 can rotate relative to the lock gear 28, in a state in which the cam portion 62 is inserted within the circular hole 32 of the lock gear 28 via the hole for inserting through 54 of the gear case 52 and does not contact the knurled surface 34.

The gear portion 60, at which a plurality of pinion teeth are formed at the outer peripheral portion thereof, is provided coaxially and integrally with an one side in the axial direction (in the direction of arrow A) of the cam portion 62. The gear portion 60 is disposed so as to project-out to the outer side (in the direction of arrow A) of the circular hole 32 of the lock gear 28 and the hole for inserting through 54 of the gear case 52, and corresponds to a rack bar 78 of a piston 74 which will be described later.

A rotating pivot portion 120, which is shaped as a cylindrical tube, is provided coaxially and integrally with an one side in the axial direction (in the direction of arrow A) of the gear portion 60. The rotating pivot portion 120 passes-through a circular hole 81 formed in a cover plate 80 which will be described later and is anchored by a snap ring (not shown), such that the pinion 58 is rotatably supported by the cover plate 80.

A circular hole portion 122, which passes-through along the axial direction, is formed in the axially central portion of the pinion 58 (the cam portion 62, the gear portion 60, and the rotating pivot portion 120). The pivot portion 25 of the torsion shaft 24 passes coaxially through the hole portion 122. Note that the inner diameter of the hole portion 122 is formed to be sufficiently larger than the outer diameter of the pivot portion 25 of the torsion shaft 24, such that the pivot portion 25 passes-through the hole portion 122 in a state in which it does not contact the hole portion 122.

On the other hand, a clutch plate 64, which structures the pretensioner device 56, is disposed between the pinion 58 and the gear case 52. The clutch plate 64 has a base plate portion 124 which is formed in a ring-shape and is disposed between the gear case 52 and the gear portion 60 of the pinion 58. A plurality of arm portions 126 are provided at uniform intervals along the peripheral direction, at the inner periphery of the base plate portion 124. The proximal ends of the plurality of arm portions 126 are formed integrally with the base plate portion 124 (are connected integrally to one another by the base plate portion 124), whereas the respective distal ends (free ends) extend in the take-up direction (the direction of arrow E). Note that predetermined spaces are formed between the plurality of arm portions 126 and the base plate portion 124.

Meshing claws 128 extend toward the lock gear 28 side (the side in the direction of arrow B) from each distal end of the plurality of arm portions 126. These plural meshing claws 128 are inserted into the circular hole 32 of the lock gear 28, and mesh-together with the valley portions of the engaging teeth 114 of the cam portion 62. The clutch plate 64 is thereby supported coaxially at the pinion 58. Further, the clutch plate 64 can rotate relative to the lock gear 28, without the meshing claws 128 contacting the knurled surface 34.

Second projections 130, which project-out toward one side in the peripheral direction of the cam portion 62 (the side in the take-up direction, i.e., in the direction of arrow E), are formed at the plurality of meshing claws 128. The end surfaces in the take-up direction (in the direction of arrow E) of the respective second projections 130 face the rotation restricting walls 116 of the cam portion 62. The gear portion 60 side (the side in the direction of arrow F) end surfaces of the respective second projections 130 face the first projections 118 of the cam portion 62.

On the other hand, as shown in FIG. 1, an operation source 67, which structures the pretensioner device 56, is disposed at the lower side (the side in the direction of arrow D) of the pinion 58. The operation source 67 has a cylinder 68 which is shaped as a substantially L-shaped cylindrical tube. The cylinder 68 is fixed to the outer side (the side in the direction of arrow A) of the one side wall 12A of the frame 12, beneath the pinion 58. At the lower end (end portion in the direction of arrow D) of the cylinder 68, a gas generator 70 is provided, and a generator cap 72, which is shaped as a cylindrical tube having a floor, is fixed. The gas generator 70 closes the lower end of the cylinder 68 in the state in which the generator cap 72 is placed thereon.

The operation source 67 has the piston 74. The piston 74 has a flange portion 75, which is shaped as a collar and is movably fit-together with the inner surface of the cylinder 68, and the rack bar 78, which is provided so as to extend toward the upper side (the side in the direction of arrow C) of the flange portion 75. An O-ring 76 is mounted to the lower side (the side in the direction of arrow D) of the flange portion 75, and seals the region between the cylinder 68 and the lower end of the piston 74.

Further, the pretensioner device 56 has the cover plate 80 which is formed substantially in the shape of a triangular columnar container. The cover plate 80 is fixed to the outer side (the side in the direction of arrow A) of the one side wall 12A. As described above, the pinion 58 is supported rotatably at the circular hole 81 of the cover plate 80. The pivot portion 25, which passes-through the hole portion 122 of the pinion 58, projects-out to one side (the side in the direction of arrow A) of the cover plate 80. The other side the side in the direction of arrow B) and the lower side (the side in the direction of arrow D) of the cover plate 80 are open. The cover plate 80 houses, at the interior thereof, the pinion 58, the clutch plate 64, and the upper portion of the piston 74. The gear case 52 is sandwiched between the cover plate 80 and the one side wall 12A of the frame 12.

An acceleration detecting mechanism 82 is provided at one side (the side in the direction of arrow A) of the cover plate 80. The acceleration detecting mechanism 82 has a box-shaped sensor holder 84 whose other side the side in the direction of arrow B) is open. The sensor holder 84 is formed of a resin material, and is mounted to the opposite side of the wall 12A to the side at which the spool 18 is located. A circular shaft-receiving hole 85 is formed in the floor wall of the sensor holder 84. One end portion (end portion in the direction of arrow A) of the pivot portion 25 (the torsion shaft 24) which passes-through the hole portion 122 of the pinion 58, is freely rotatably supported by this shaft-receiving hole 85.

One side (the side in the direction of arrow A) of the sensor holder 84 is covered by a box-shaped sensor cover 86 whose other side (the side in the direction of arrow B) is open. The sensor cover 86 is fixed to the sensor holder 84 and the one side wall 12A of the frame 12.

An acceleration sensor 88 is held at the lower portion (end portion in the direction of arrow D) of the sensor holder 84. The acceleration sensor 88 has a placement portion 90. A substantially inverted conical recess is formed at the top surface of the placement stand 90. A spherical body 92 is placed in the recess of the placement portion 90. A movable claw 94 is supported above the spherical body 92 so as to be freely rotatable, and is placed on the spherical body 92.

A V-gear 96 is provided in the space between the sensor holder 84 and the sensor cover 86. The V-gear 96 is integrally connected to one end portion in the axial direction (end portion in the direction of arrow A) of the pivot portion 25, and rotates integrally with the torsion shaft 24. Ratchet teeth 98 are formed at the outer periphery of the V-gear 96.

A W-pawl 100 is rotatably supported at the V-gear 96. A W-mass 102 is fixed to the W-pawl 100. A sensor spring 104 spans between the V-gear 96 and the W-pawl 100. The sensor spring 104 urges the V-gear 96 in the take-up direction with respect to the W-pawl 100.

A substantially disc-shaped gear sensor 106 is provided at one side (the side in the direction of arrow A) of the V-gear 96, in the space between the sensor holder 84 and the sensor cover 86. The gear sensor 106 is rotatably supported at one end portion in the axial direction of the pivot portion 25. A coil spring 108 spans between the gear sensor 106 and the inner surface of the sensor cover 86, and urges the gear sensor 106 in the take-up direction.

An engaging claw 110 is rotatably supported at one side (the side in the direction of arrow A), at the lower portion (end portion in the direction of arrow D) of the gear sensor 106. The central axis of rotation of the engaging claw 110 is parallel to the axial direction of the torsion shaft 24, and the engaging claw 110 can mesh-together with the ratchet teeth 98 of the V-gear 96. Further, a pushing piece 112 is formed at the other side (the side in the direction of arrow B), at the lower portion of the gear sensor 106.

Operation of the present embodiment will be described next.

In the webbing retractor 10 having the above-described structure, due to the spiral spring 44 of the urging mechanism 36 urging the torsion shaft 24, the spool 18, and the lock gear 28 in the take-up direction via the screw member 26, the webbing 20 is urged in the direction of being taken-up onto the spool 18.

The acceleration sensor 88 of the acceleration detecting mechanism 82 detects that the acceleration of the vehicle (acceleration of the movement of webbing retractor 10) is greater than or equal to a predetermined acceleration. Namely, when the acceleration of the vehicle is greater than or equal to a predetermined acceleration (e.g., when the vehicle rapidly decelerates), the spherical body 92 of the acceleration sensor 88 moves on the recess of the placement surface 90 toward the side opposite to the direction of the acceleration, and rises-up, and pushes the movable claw 94 upward. In this way, the movable claw 94 rotates the engaging claw 110 of the gear sensor 106, and causes the engaging claw 110 to mesh-together with the ratchet teeth 98 of the V-gear 96. The gear sensor 106 is thereby set in a state of being connected to the V-gear 96.

The W-pawl 100, the W-mass 102, and the sensor spring 104 of the acceleration detecting mechanism 82 detect that the pull-out acceleration of the webbing 20 (acceleration of the rotational movement of the spool 18 in the pull-out direction) is greater than or equal to a specific acceleration. Namely, when the pull-out acceleration of the webbing 20 is greater than or equal to a specific acceleration, the rotation of the W-pawl 100 and the W-mass 102 in the pull-out direction due to inertia, with respect to the V-gear 96 which is rotated in the pull-out direction via the spool 18 and the torsion shaft 24, is suppressed. The W-pawl 100 and the W-mass 102 are thereby rotated with respect to the V-gear 96. In this way, due to the W-pawl 100 rotating the engaging claw 110 of the gear sensor 106 and causing the engaging claw 110 to mesh-together with the ratchet teeth 98 of the V-gear 96, a state in which the gear sensor 106 and the V-gear 96 are connected arises.

At the time when the state in which the gear sensor 106 and the V-gear 96 are connected arises as described above, due to the pull-out load applied to the webbing 20 from the vehicle occupant, the V-gear 96 and the gear sensor 106 rotate somewhat in the pull-out direction via the spool 18 and the torsion shaft 24. Note that, in this case, the torque of the V-gear 96 and the gear sensor 106 is decreased by the urging force of the sensor spring 104 which increases due to the inertia of the W-pawl 100 and the W-mass 102.

Due to the gear sensor 106 being rotated somewhat in the pull-out direction in this way, the pushing piece 112 of the gear sensor 106 rotates the lock plate 48 of the locking member 46 toward the lock gear 28. In this way, pull-out load is applied from the vehicle occupant to the webbing 20, and torque in the pull-out direction is applied to the spool 18, the torsion shaft 24, and the lock gear 28. The lock teeth 50 of the lock plate 48 thereby mesh-together with the ratchet teeth 30 of the lock gear 28, rotation of the lock gear 28 in the pull-out direction is impeded, and pulling-out of the webbing 20 is impeded.

Moreover, in this state in which the pulling-out of the webbing 20 is impeded in this way, when the torsional load applied from the vehicle occupant to the torsion shaft 24 via the webbing 20 and the spool 18 is greater than or equal to a predetermined value, the force limiter mechanism operates, and, due to the torsionally deforming portion 23 of the torsion shaft 24 torsionally deforming, the spool 18 is rotated in the pull-out direction independently of the lock gear 28. In this way, the webbing 20 is pulled-out, and the load (energy) applied from the webbing 20 to the vehicle occupant is absorbed.

Further, at the time of an emergency of the vehicle (e.g., at a predetermined time such as when the vehicle rapidly decelerates or the like), due to the gas generator 70 of the pretensioner device 56 supplying gas to the interior of the cylinder 68, the piston 74 moves upward (in the direction of arrow C). When the piston 74 moves upward, the rack bar 78 of the piston 74 meshes-together with the gear portion 60 (the pinion teeth) of the pinion 58, and the pinion 58 is rotated in the take-up direction by an amount corresponding to the moving stroke of the rack bar 78. As a result, the inclined surfaces 115 of the engaging teeth 114 interfere with the meshing claws 128 of the clutch plate 64, and push the meshing claws 128 from the inner side in the radial direction toward the outer side in the radial direction.

When the meshing claws 128 receive the pushing force (deformation force) from the reverse surface thereof from the inclined surfaces 115 of the engaging teeth 114, the arm portions 126 swing around their fixed end (proximal end) toward the outer side in the radial direction. The meshing claws 128 at the distal end (free end) thereof are thereby guided by the inclined surfaces 115 and moved toward the knurled surface 34 of the lock gear 28 (the deformation of the meshing claws 128 toward the outer side in the radial direction is obtained as deformation of the arm portions 126 toward the outer side in the radial direction). In this way, the outer surfaces in the radial direction of the meshing claws 128 abut (bite-into) the knurled surface, and the clutch is set in a connected state. In this state, the torque of the pinion 58 is transmitted to the lock gear 28 via the clutchplate 64. Therefore, due to the pinion 58 rotating in the take-up direction, the lock gear 28 also rotates in the webbing take-up direction. As a result, the spool 18 is rotated instantaneously in the take-up direction, and the webbing 20 is fit tightly to the upper body of the vehicle occupant.

Here, in the pretensioner device 56 relating to the embodiment of the present invention, the engaging teeth 114 of the pinion 58 have the first projections 118 which project-out toward the other side in the peripheral direction of the cam portion 62 (toward the pull-out direction, i.e., the direcition of arrow F). Further, the meshing claws 128 of the clutch plate 64 have the second projections 130 which project-out toward one side in the peripheral direction of the cam portion 62 (toward the take-up direction, i.e., the direction of arrow E), and whose end surfaces of the gear portion 60 side (the side in the direction of arrow A) face the first projections 118. In the state before the pretensioner device 56 operates, movement of the clutch plate 64 toward the one side in the axial direction (the gear portion 60 side, i.e., the side in the direction of arrow A) with respect to the pinion 58 is limited due to the engagement of the second projections 130 with the first projections 118. Accordingly, in the pretensioner device 56, in the state before operation, even if some type of external force is applied to the clutch plate 64, positional offset of the clutch plate 64 toward the one side in the axial direction (the gear portion 60 side) with respect to the pinion 58 can be prevented. In this way, the position of engagement between the engaging teeth 114 of the pinion 58 and the meshing claws 128 of the clutch plate 64 can be maintained at its original setting. Therefore, when the pretensioner device 56 operates, the clutch can reliably be connected.

Further, in the pretensioner device 56 relating to the embodiment of the present invention, because positional offset of the clutch plate 64 toward the one side in the axial direction (the gear portion 60 side) with respect to the pinion 58 can be prevented as described above, the clutch plate 64 can be prevented from interfering with the rack bar 78 at the time when the piston 74 moves and the rack bar 78 meshes-together with the gear portion 60 of the pinion 58.

Moreover, in the pretensioner device 56 relating to the embodiment of the present invention, the first projections 118 of the pinion 58 are formed only at one side in the peripheral direction (the side in the pull-out direction, i.e., in the direction of arrow F) of the engaging teeth 114 of the cam portion 62. The second projections 130 of the clutch plate 64 are formed only at one side in the peripheral direction (the side in the take-up direction, i.e., in the direction of arrow E) of the meshing claws 128 of the cam portion 62. Accordingly, as compared with a case in which the first projections 118 are formed at the both sides in the peripheral direction of the engaging teeth 114 of the cam portion 62 and the second projections 130 are formed at the both sides in the peripheral direction of the meshing claws 128 of the cam portion 62, the configurations are simple, and the surface area of engagement between the first projections 118 and the second projections 130 (i.e., the strength of engagement between the first projections 118 and the second projections 130) can be ensured easily.

In addition, in the pretensioner device 56 relating to the embodiment of the present invention, the engaging teeth 114 of the pinion 58 have the rotation restricting walls 116 which face the take-up direction side end surfaces of the meshing claws 128 of the clutch plate 64. In the state before the pretensioner device operates, relative rotation of the clutch plate 64 in the take-up direction (the direction of arrow E) with respect to the pinion 58 is limited due to the aforementioned end surfaces of the meshing claws 128 engaging with the rotation restricting walls 116 of the pinion 58. Accordingly, in this pretensioner device 56, before operation, even if some type of external force is applied to the clutch plate 64, positional offset of the clutch plate 64 in the take-up direction with respect to the pinion 58 can be prevented.

As described above, in the pretensioner device 56 relating to the embodiment of the present invention, positional offset of the clutch plate 64 with respect to the pinion 58 can be prevented.

Note that a rack-and-pinion type pretensioner device 56 is employed in the above-described embodiment. However, the present invention is not limited to the same, and can be applied as well to wire-winding-type pretensioner devices or other types of pretensioner devices.

What is claimed is:

1. A pretensioner device comprising:
a take up shaft;
a cylindrical portion provided coaxially and integrally with one side in the axial direction of said take-up shaft at which a webbing for restraining a vehicle occupant is taken-up and pulled-out, the cylindrical portion being open toward an outer side;
a piston provided at one side in the axial direction of the cylindrical portion, and moving due to operation of a gas generating means in an emergency;
a rotating body which is disposed relatively rotatably at the cylindrical portion and at whose outer peripheral portion a plurality of engaging teeth are formed, the rotating body being rotated in a webbing take-up direction due to the piston moving; and
a substantially flat clutch plate having a plurality of meshing claws which are connected together integrally and which respectively fit-together with valley portions of the plurality of engaging teeth of the rotating body, and when the rotating body rotates relatively to the clutch plate in the webbing take-up direction, the plurality of meshing claws are guided by the plurality of engaging teeth, and deform outwardly, and engage an inner peripheral surface of the cylindrical portion,
wherein the engaging teeth of the rotating body have first projections which project-out in a peripheral direction of the rotating body, each of said projections having a side surface;
the meshing claws of the clutch plate have second projections which project-out axially from the clutch plate and in the peripheral direction of the rotating body and whose end surfaces, at one side in an axial direction of the rotating body, are offset from a plane of said clutch plate and face the first projections, and
wherein the end surfaces of the second projections engage with the side surfaces of the first projections so that, movement of the clutch plate in an axial direction with respect to the rotating body is restricted.

2. The pretensioner device of claim 1, wherein
the piston has a rack bar which projects in a moving direction,
the rotating body has a plurality of pinion teeth which are formed integrally with one side in the axial direction of the plurality of engaging teeth, and which are disposed at an outer peripheral surface of the cylindrical portion, and with which the rack bar meshes-together when the piston moves,
the first projections of the rotating body are formed at the pinion teeth side of the engaging teeth, and
movement in the axial direction of the clutch plate toward the pinion teeth side with respect to the rotating body is restricted.

3. The pretensioner device of claim 1, wherein the first projections of the rotating body are formed only at one side in the peripheral direction of the engaging teeth of the rotating body, and the second projections of the clutch plate are formed only at one side in the peripheral direction of the meshing claws of the rotating body.

4. The pretensioner device of claim 1, wherein said plurality of engaging teeth of said rotating body each includes a tooth surface which engages a portion of one of the meshing claws of the clutch plate that does not include one of said second projections, and wherein said first projection of each tooth projects-out from said tooth surface in a peripheral direction.

5. A pretensioner device comprising:

a take up shaft;

a cylindrical portion provided at one end in the axial direction of said take-up shaft at which a webbing for restraining a vehicle occupant is taken-up and pulled-out;

a rotating body which is disposed relatively rotatably at the cylindrical portion, and which has a plurality of engaging teeth at an outer peripheral portion thereof, and which rotates in a webbing take-up direction in an emergency; and a substantially flat clutch plate having a plurality of meshing claws which engage with the plurality of engaging teeth of the rotating body, the clutch plate being disposed at an inner side of the cylindrical portion while engaging with the rotating body, and the plurality of meshing claws rotating the cylindrical portion in the webbing take-up direction due to the rotating body rotating in the webbing takeup direction, wherein the plurality of engaging teeth of the rotating body have first projections having side surfaces at one side in the axial direction, of the rotating body;

the plurality of meshing claws of the clutch plate have second projections having end surfaces offset from a plane of said clutch plate toward one side in the axial direction, and relative movement, in an axial direction, of the clutch plate and the rotating body is restricted due to the side surfaces of the first projections and the end surfaces of the second projections abutting one another when the engaging teeth and the meshing claws engage.

6. The pretensioner device of claim 5, wherein the cylindrical portion has an inner peripheral surface which is subjected to knurling, and when the rotating body rotates in the webbing take-up direction, outer surfaces in the radial direction of the plurality of meshing claws of the clutch plate abut the knurled surface of the cylindrical portion and rotate the cylindrical portion in the webbing take-up direction.

7. The pretensioner device of claim 5, wherein the rotating body has a plurality of pinion teeth which project-out toward outer side in the radial direction at an outer peripheral surface, at one side in an axial direction, of the rotating body.

8. The pretensioner device of claim 7, wherein a gas generator and a piston having a rack bar are provided at one side in the axial direction of the cylindrical portion, and the rack bar meshes-together with the pinion teeth, and, due to gas, which is generated by the gas generator, moving the piston, the rotating body is rotated in the webbing take-up direction.

9. The pretensioner device of claim 5, wherein the first projections of the rotating body are provided only at one side in the peripheral directions of the engaging teeth, and the second projections of the clutch plate are provided only at one side in the peripheral directions of the meshing claws.

10. The pretensioner device of claim 5, wherein rotation restricting walls are provided at the side in the webbing pull-out direction of the engaging teeth of the rotating body, and the rotation restricting walls restrict relative rotation of the meshing claws of the clutch plate in the webbing take-up direction with respect to the rotating body.

11. The pretensioner device of claim 5, wherein said plurality of engaging teeth of said rotating body each includes a tooth surface which engages a portion of one of the meshing claws of the clutch plate that does not include one of said second projections, and wherein said first projection of each tooth projects-out from said tooth surface in a peripheral direction.

* * * * *